UNITED STATES PATENT OFFICE.

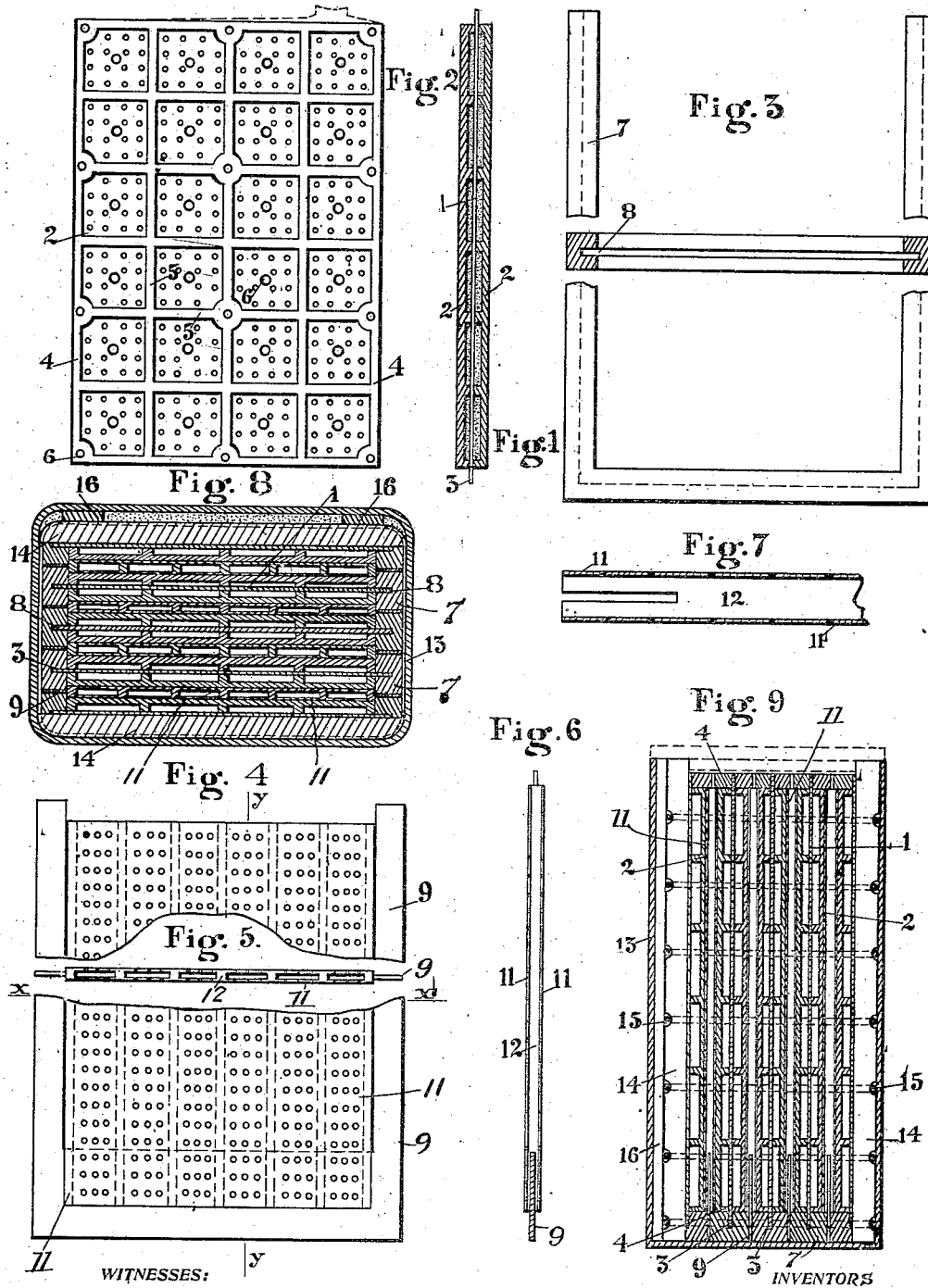

JOHN L. SMITH AND MALCON O. SMITH, OF CLEVELAND, OHIO.

STORAGE BATTERY.

No. 903,799.

Specification of Letters Patent.

Patented Nov. 10, 1908.

Application filed July 20, 1908. Serial No. 444,447.

*To all whom it may concern:*

Be it known that we, JOHN L. SMITH and MALCON O. SMITH, citizens of the United States of America, residing at Cleveland, in the county of Cuyahoga and State of Ohio, have invented certain new and useful Improvements in Storage Batteries, of which the following is a specification, reference being had therein to the accompanying drawings.

This invention relates to electric storage batteries of the cell type and is specifically designed to meet the requirements for vehicular use with the special object in view to make a battery that can be taken out, cleaned and replaced without taking the vehicle out of commission and which is able to withstand the severe test in heavy power regulation.

To this end the invention consists in the construction arrangement and operation of certain parts for accomplishing the desired object, all as more fully hereinafter described and shown in the accompanying drawings, in which:—

Figure 1 is a cross section of a bipolar plate electrode used in the battery, Fig. 2 is a detached elevation of one of the two perforated lead sheets for holding the active material, Fig. 3 is an elevation of the insulating supporting frame for the electrodes, Fig. 4 is an elevation of one of the separators and its accompanying mudguard, Figs. 5 and 6 are horizontal and vertical sections of Fig. 4 on line $x$—$x$ and $y$—$y$ respectively, Fig. 7 is a fragmentary vertical section of the separator without the mud guard. Figs. 8 and 9 are horizontal and vertical sections respectively through the battery as a whole.

The battery is divided into cells by vertical lead-plates which have sides of opposite polarity and consist of a central solid lead sheet 1 and of two perforated lead sheets 2 secured upon opposite sides thereof and of sufficiently smaller area to leave a free projecting margin 3 around the edges thereof. The lead sheets 2 have raised edges 4 and corresponding intersecting ribs 5 upon the side towards the central sheet and the recesses formed thereby contain the active material. Suitable holes 6 may be formed in these sheets for securing the sheets together by means of lead rivets passing through them or they may be secured to the central sheet by soldering along the edges or in any other desired manner.

The end plates are formed by solid lead sheets having the active material and the holding sheet thereof applied to only one side and they are also provided with suitable terminals for electric connection. These lead plates are set into frames 7 of soft rubber or other elastic non-conducting material, the frames being provided upon their inner faces with grooves 8 of sufficient size and depth to seat the marginal portions 3 of the lead plates therein. The lead plates are spaced apart by these soft rubber frames 7 and hard rubber frames 9 of the same size as the frame 7 but of less thickness are interposed between said frames. The frames 9 perform the office of mud guards by having the vertical dimension of its bottom bar exceed that of the bottom bar of the frames 7 so that it projects into the space between the lead plates. The space between each pair of lead plates contains a separator fitting the dimensions of the same, each consists of two thin perforated hard rubber sheets 11 and interposed vertical partition strips 12 of hard rubber spaced at intervals apart from each other and united to the sheets. To permit the separator to straddle the mud guard each separator is grooved in its bottom edge to receive the mud guard. A separator thus constructed is light, stiff and suitably flexible and the vertical passages between the spacing strips form ample space for the electrolyte.

The elements may be assembled into an operative structure in any known manner of holding them in fixed relation to each other as by clamping them together between suitable clamping plates without using an outer receptacle, but we prefer to place the battery into a receptacle 13 of aluminum after clamping the elements together between two clamping plates 14. These are preferably grooved upon their outer faces whereby the elements after being assembled between the clamping plates and firmly clamped together in a press can be bound together by inserting wires 15 into the grooves and tying the ends thereof together by suitable ties or by merely hooking or twisting the ends together at the sides. The battery can then be placed into the receptacle and by means of blocks 16 inserted at the corners at one or both ends it is firmly fastened therein. The remaining empty space or spaces may be filled with sand or other material. In this way the battery is firmly held in position in the receptacle and yet it can be readily removed and replaced as a whole; further on account of the particular construction of the separators it can be readily cleaned since by turning it on its side and using a hose it can be thoroughly washed out while in the present construction of batteries of this type it takes about a week to do this during which time the vehicle is out of commission. In all other respects the construction is adapted to meet the requirements for vehicular use and for its manufacture on a commercial scale.

What we claim as our invention is:—

1. A storage battery cell comprising two lead plates, two elastic non-conducting frames in which the edges of the plates are seated, and a mud guard frame of non-elastic non-conducting material clamped between the plate holding frames each frame being composed of two side bars and a bottom bar, the vertical dimension of the bottom bar of said mud guard frame being greater than that of the corresponding bars of the plate holding frames between which it is clamped.

2. A storage battery cell comprising two lead plates, two soft rubber frames having longitudinal grooves in which the edges of the plates are seated and spacing the plates apart, a mud guard frame of hard rubber clamped between the plate holding frames and having a bottom bar projecting into the space between the lead plates, and a separator of hard rubber contained in the space between the lead plates, its lower edge being grooved and straddling the bottom bar of the mud guard frame.

3. In a storage battery, a bipolar battery element comprising a soft rubber frame provided with longitudinal grooves in its inner edges, two plate electrodes, one positive and one negative, and a solid lead plate interposed between the two and in metallic connection with the inner faces thereof, the two plate electrodes being of a size to fit within the frame and the interposed lead plate being of a size to form marginal projections around the edges of the plate electrodes adapted to engage into and seat said lead plate in the grooves of the frame.

In testimony whereof we affix our signatures in presence of two witnesses.

JOHN L. SMITH.
MALCON O. SMITH.

Witnesses:
R. J. WARDNER,
WM. F. LASSMAN.